(12) United States Patent
Mantell et al.

(10) Patent No.: US 11,412,755 B2
(45) Date of Patent: Aug. 16, 2022

(54) METHOD OF PRINTING CHOCOLATE STRUCTURES

(71) Applicant: Xerox Corporation, Norwalk, CT (US)

(72) Inventors: David A. Mantell, Rochester, NY (US); Andrew W. Hays, Fairport, NY (US); Zahra C. Langford, Weed, CA (US)

(73) Assignee: XEROX CORPORATION, Norwalk, CT (US)

( * ) Notice: Subject to any disclaimer, the term of this patent is extended or adjusted under 35 U.S.C. 154(b) by 855 days.

(21) Appl. No.: 15/954,177

(22) Filed: Apr. 16, 2018

(65) Prior Publication Data
US 2018/0228178 A1 Aug. 16, 2018

Related U.S. Application Data

(63) Continuation of application No. 14/193,874, filed on Feb. 28, 2014, now abandoned.

(51) Int. Cl.
*A23G 3/34* (2006.01)
*A23G 3/54* (2006.01)
(Continued)

(52) U.S. Cl.
CPC ......... *A23G 3/0089* (2013.01); *A23G 1/0006* (2013.01); *A23G 1/0056* (2013.01);
(Continued)

(58) Field of Classification Search
CPC .............. A23G 1/56; A23G 1/02; A23G 1/30
See application file for complete search history.

(56) References Cited

U.S. PATENT DOCUMENTS 2,786,764 A 3/1957 Rivoche
3,044,123 A 7/1962 Grubaugh
(Continued)

FOREIGN PATENT DOCUMENTS

CN 201033488 3/2008
EP 0498357 A2 12/1992
(Continued)

OTHER PUBLICATIONS

The World's First Commercial 3D Chocolate Printer YouTube video and article (referred to herein as 3DchocolateNPL, http://www.fastcodesign.com/1669574/the-worid-first-commercial-3-d-chocolate-printer-is-on-sale, 2011.
(Continued)

*Primary Examiner* — Anthony J Weier
(74) *Attorney, Agent, or Firm* — MH2 Technology Law Group LLP

(57) ABSTRACT

A method for printing a three-dimensional crystalline structure such as a chocolate layer wherein, after printing, the material has a desired crystal structure and a plurality of non-random cavities. An embodiment can include printing a liquid first layer of material with a printer onto a second layer of material having a crystal structure. Subsequently, the printed liquid first layer is processed to solidify the first layer. During the processing of the printed liquid first layer, the second layer functions as a crystal seed layer through physical contact with the printed liquid first layer and the second layer crystallizes with the crystal structure. In some embodiments, confections may be formed from high-quality chocolate, where the confection has a reduced caloric content with acceptable mouthfeel. In other embodiments, a confection may have a previously unrealized mouthfeel and taste.

25 Claims, 5 Drawing Sheets

(51) Int. Cl.

| | |
|---|---|
| *A23G 1/54* | (2006.01) |
| *A23G 1/52* | (2006.01) |
| *B33Y 10/00* | (2015.01) |
| *A23G 1/00* | (2006.01) |
| *A23G 1/50* | (2006.01) |
| *B33Y 80/00* | (2015.01) |
| *A23P 20/25* | (2016.01) |

(52) U.S. Cl.
 CPC .............. *A23G 1/0066* (2013.01); *A23G 1/50* (2013.01); *A23G 1/52* (2013.01); *A23G 1/54* (2013.01); *A23G 1/545* (2013.01); *A23G 3/0097* (2013.01); *A23G 3/545* (2013.01); *B33Y 10/00* (2014.12); *B33Y 80/00* (2014.12); *A23P 2020/253* (2016.08)

(56) References Cited

U.S. PATENT DOCUMENTS

| | | | |
|---|---|---|---|
| 5,085,890 | A | 2/1992 | Niaura et al. |
| 6,302,677 | B1 | 10/2001 | Suttle et al. |
| 2010/0055257 | A1 | 3/2010 | Hervig |
| 2010/0221373 | A1 | 9/2010 | Chen et al. |
| 2012/0251688 | A1 | 10/2012 | Zimmerman et al. |
| 2012/0251689 | A1 | 10/2012 | Batchelder |

FOREIGN PATENT DOCUMENTS

| | | |
|---|---|---|
| WO | 9830111 A1 | 7/1998 |
| WO | 2012076205 A1 | 6/2012 |

OTHER PUBLICATIONS https://library.osu.edu/assets/uploads/ScienceCafe/Barringer020310.pdf, 2012.

Daniel L. Cohen et al., "Hydrocolloid Printing: A Novel Platform for Customized Food Production", pp. 1-11. http://creativemachines.cornell.edu/sites/default/files/SFF09_Cohen1_0.pdf, accessed Oct. 31, 2012.

Deborah Southerland et al., "Edible 3D Printing", NIP 27 and Digital Fabrication 2011, Technical Program and Proceedings, 2011 Society for Imaging Science and Technology, pp. 819-822.

University of Exeter, "University of Exeter announces spin out company for 3D chocolate printing", Apr. 7, 2012, p. 1. http://www.exeter.ac.uk/news/university/title_201237_en.html, accessed Oct. 31, 2012.

Extended European Search Report dated Jan. 17, 2014, European Application No. 13190239.7, filed Oct. 25, 2013, pp. 1-5.

Mantell et al., "Printing 3D Tempered Chocolate", U.S. Appl. No. 13/666,428, filed Nov. 1, 2012.

METHOD OF PRINTING CHOCOLATE STRUCTURES

CROSS-REFERENCE TO RELATED APPLICATIONS

This application is a continuation of U.S. patent application Ser. No. 14/193,874, filed on Feb. 28, 2014, the entirety of which is hereby incorporated by reference herein.

FIELD OF THE EMBODIMENTS

The present teachings relate to the field of forming crystal structures and more particularly to methods for printing a layer having a desirable crystal structure, for example a chocolate layer having a desirable degree of crystallization or temper.

BACKGROUND OF THE EMBODIMENTS

Various compounds can have different crystal structures depending on factors such as temperature. For example, chocolate, and more particularly cocoa butter within chocolate, can generally have one of six crystal structures depending on how it is produced. The crystal structures range from type I to type VI with each crystal type having a different melting point. Generally accepted melting points of cocoa butter crystal types are as follows: type I: 17° C.; type II: 21° C.; type III: 26° C.; type IV: 28° C.; type V: 34° C.; type VI: 36° C. Type VI crystals require an extended duration of time (a matter of months) to form and are not found in typical chocolate.

Tempering of chocolate during production is necessary to produce a product with as many type V crystals as possible, which is the cocoa butter crystal structure typically used for consumer chocolate. To temper chocolate to produce type V crystals, the chocolate can be heated to a temperature which is higher than the type IV crystal melting temperature, for example 31° C. to 32° C. for a duration of time which is sufficient to melt the type I to type IV crystals, then cooled. During the cooling, the type V crystals that remain function as crystallization nuclei, around which other type V crystals will form.

In another method of forming type V cocoa butter crystals, a solid seed chocolate having a preponderance of type V crystal structures is dispensed into a melted chocolate which is at a temperature between the type IV and type V crystal melting point. The type V crystals in the solid chocolate function as crystallization nuclei for the molten material such that the melted chocolate crystallizes into a type V cocoa butter crystal structure.

Quality chocolate with a type V crystal structure has desirable characteristics, such as a shiny surface, a firm texture, a good snap, a melting point which is above typical ambient temperatures but generally around human body temperature and a texture and appearance which will not degrade over time.

Attempts have been made to fashion three dimensional designs with chocolate using a chocolate dispenser (printer) with a controlled placement of material. This chocolate printing may include dispensing an in-temper material. However, due to high viscosity of in-temper chocolate, the material must be extruded, which requires a large extrusion nozzle size that has a large resolution and is thereby unable to form well-defined, small resolution features. Heating chocolate to a higher temperature to achieve a lower viscosity can cause the chocolate to lose temper. Thus current 3D chocolate printers cannot print fine 3D structures which have a high percentage of cocoa butter type V crystal structures. Current methods of chocolate printing can result in printed chocolates that lack the required resistance to elevated temperatures and other desirable properties of snap, surface finish, and texture.

Additionally, current chocolate processing is limited by the techniques used in the processing. For example, a chocolate confection might contain a flavored center and an outside coating of solid chocolate. Current variety in texture consists of using fillings such as a smooth ganache mixed with nuts or layering different fillings.

Further, consumers take cues on how much to eat largely based on visual appearance of the product before it is consumed rather than on the actual caloric value of the product itself. Lowering a product's calorie count by removing fat and/or sugar may result in a flat and unsatisfying consumer experience. Hollow chocolate does not produce a desirable consumer experience, as a bite simply breaks the outer shell and provides no subsequent bite resistance. Aerated chocolate formed by injecting gas at high pressures into the molten chocolate has a conventional external form factor and reduces overall calorie count. However, the randomized air bubbles provide a less-than-desirable texture as the product is consumed. Further, the randomized bubbles in the internal structure of the uneaten portion of the product after an initial bite are not visually appealing.

New production techniques and the resulting new confection designs would be desirable.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

In an embodiment, a method for printing an edible confection having a three-dimensional crystalline structure may include printing a liquid first layer of material with a printer onto a second layer of material having a crystal structure to form a plurality of walls, wherein each of the plurality of walls physically contacts the second layer of material and extends from the second layer of material at an angle, processing the printed liquid first layer to solidify the plurality of walls, and printing a liquid third layer of material with the printer onto the second layer of material to form a ceiling that physically contacts the plurality of walls to form a plurality of non-random cavities within the confection, wherein the ceiling comprises a surface that intersects a surface of the second layer of material at an angle.

In another embodiment, a confection may include a plurality of chocolate walls, wherein each chocolate wall has a thickness of between 5 micrometers and 10 millimeters, a plurality of non-random cavities formed at least partly by the plurality of chocolate walls, and an outer shell that seals the plurality of non-random cavities within the confection.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
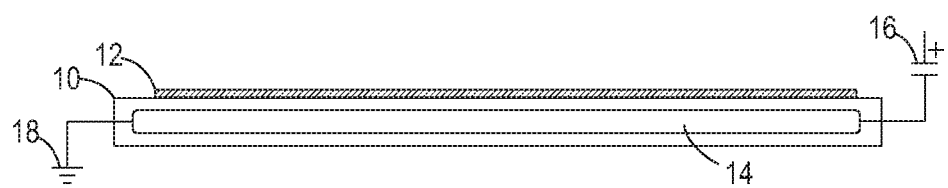
FIGS. 1, 2, 3, and 4 are cross sections of a first embodiment of the present teachings for printing a three-dimensional structure having a desired crystal structure.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified, a "printer" encompasses any apparatus that performs a deposition of a material onto a substrate. While the present teachings are described herein with reference to a printer that prints an edible material, specifically a chocolate printer, it will be understood that any edible confectionery material or non-edible material which is manufactured to include a particular crystal structure and which is capable of crystallizing through the use of a crystallization nucleus or crystal seed may advantageously incorporate an embodiment of the present teachings. Additionally, for purposes of the present description, the work "ink" is used to refer to any material that is dispensed by the printer, and can include an edible material (e.g., chocolate) and/or an inedible material, for example any element, molecule, compound, or mixture that falls within the scope of the present teachings. Further, unless otherwise specified, a "molten" material includes a material that is in a non-solid form, for example liquid or semi-viscous.

An embodiment of the present teachings can include printing a first material which has an undesired crystal to result in a second material that has a desired crystal shape. The final structure may be a non-edible material used for commercial or consumer purposes. The final structure may also be an edible confection having a desired crystal shape such as a chocolate structure having a three dimensional (3D) shape. The text below describes the present teachings with regard to a chocolate layer, but it will be understood that the present teachings may apply to any edible or inedible materials. In an embodiment, the completed 3D structure may have a desirable crystal configuration, such as a type V cocoa butter crystal structure. An untempered molten chocolate layer can be dispensed or printed upon a tempered chocolate base layer such as a solid chocolate base layer having a type V cocoa butter crystal structure. As the molten chocolate is printed onto the base layer, the solid chocolate base layer functions as a crystal seed layer or crystallization nucleus through physical contact with the printed layer. As the molten chocolate cools, its crystal structure conforms to that of the base layer to result in a 3D structure having a desired cocoa butter crystal structure (i.e., a desired temper).

An embodiment of the present teachings can include a method and in-process structures which can be formed during an embodiment of the present teachings, for example as depicted in FIGS. 1-4 and described in the accompanying text.

FIG. 1 depicts a substrate 10 and a base layer 12 which overlies and/or contacts the substrate 10. The substrate 10 can include a metal layer, a polymer layer, a plastic layer, etc., and may be electrically and/or thermally conductive. The base layer 12 can be a chocolate base layer having a particular crystal structure such as a type V cocoa butter crystal structure. In an embodiment, the base layer 12 can have a thickness of between about 1.0 micrometer (μm) and about 10.0 millimeters (mm), or between about 1.0 μm and about 3.0 mm, or between about 1.0 μm and about 1.0 mm. It is contemplated that a layer thinner than 1.0 μm may be sufficient, and the base layer 12 may include a base layer in dry powder form. The base layer 12 should be sufficiently thick to cover the substrate 10 at least where a 3D structure will be printed. For example, the base layer 12 can cover the entire upper surface of the substrate 10, or a perimeter of the substrate 10 can be exposed around a centrally located base layer 12. A base layer 12 which is insufficiently thick can include undesirable gaps or may fail to retain its crystalline form when hot ink is printed thereon. In certain embodiments of the present teachings, an excessively thick base layer 12 may not allow for processing as described below.

In an embodiment, the base layer 12 can be applied to the substrate 10 as a molten layer having a type V crystal structure which coats at least a portion of an upper surface of the substrate 10. After application, the molten base layer 12 can be cooled such that it solidifies with a type V crystal structure. In another embodiment, the molten base layer 12 applied to the substrate 10 can have a first crystal structure, for example that is not type V (which may be no crystal structure, a type I-type IV crystal structure, a type VI crystal structure, or mixtures thereof), and then tempered after placement on the substrate 10 to have a desired second crystal structure, such as a type V crystal structure. Tempering of the first crystal structure to the second crystal structure can be performed by heating the material on the substrate 10, then cooling the material.

In an embodiment, a thermally conductive substrate 10 can be actively heated with an optional powered internal heat source 14 such as a coil that is electrically connected (i.e., electrically coupled) to power 16 and ground 18, which is heated to a temperature or a series of temperatures in order to temper the liquid, solid, powdered, or granulated base layer 12, or for other uses as described below. In another embodiment, structure 14 can represent an optional powered internal cooling source 14 such as a cooling coil which is cooled to more quickly solidify a melted base layer 12 to decrease manufacturing time. In another embodiment, element 14 can represent both an optional heat source and an optional cooling source, so that the substrate 10 can be heated and cooled as desired.

Figure 2:
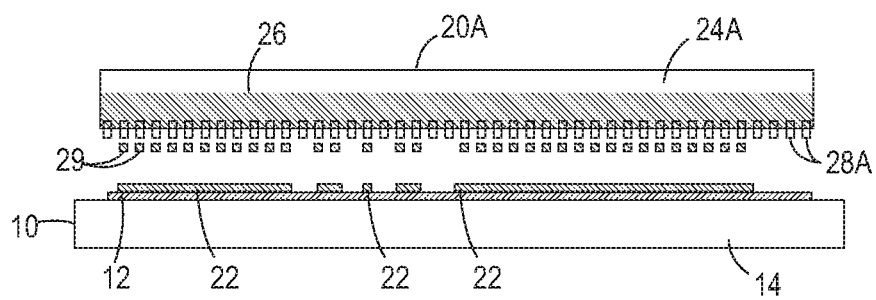

After forming the base layer 12 having a desired crystal structure, a printer or printhead 20A is used to deposit a first 3D structure layer 22 onto the base layer 12 as depicted in FIG. 2. It will be apparent to one of ordinary skill in the art that the structures such as printer 20A, substrate 10, etc., depicted in the FIGS. represent generalized schematic illustrations and that other structures or elements can be added or existing structures or elements can be removed or modified. In an embodiment, the printer can include a reservoir 24A which contains a supply of material 26 and, in this embodiment, a plurality of nozzles 28A through which the material 26 is printed or extruded under pressure. For printing of chocolate material 26, the chocolate can be heated to a temperature that is sufficient to soften or melt all of the cocoa butter crystals, for example to a temperature of above 40° C., for example between about 40° C. to about 60° C. Additionally, chocolate at this temperature has a viscosity that is sufficiently low so that the chocolate 26 is ejected or flows easily through the printer 20A and out of the nozzle 28A. However, heating chocolate to this temperature for a low viscosity material causes the chocolate to lose its temper, as the temperatures required to generate the desired in-temper crystals forms a material that is very thick and does not flow with sufficient ease for printing.

Printer 20A may be, for example, a drop-on-demand (DOD) ink jet printer. Ink, for example chocolate, can be ejected as a plurality of droplets 29 through the nozzles using a transducer such as a piezoelectric element which deflects a diaphragm as known in the art. The printer 20A may be a printer other than a DOD ink jet printer, such as an extrusion printer, a solid ink printer, or a printer which uses other ink printing technology. In the case of an extrusion printer, for example, droplets 29 depict extruded material 26. In the case of a DOD printer, for example, the droplets 29 can be simultaneously ejected from the plurality of nozzles 28A as individual droplets but can be printed with sufficient density so as to form a uniform first layer 22 having a desired thickness.

As the first layer 22 is deposited onto the in-temper chocolate base layer 12, the base layer 12 seeds crystallization in the first layer 22. As the first layer cools, its crystals take on the crystal configuration of the base layer 12 to form an in-temper 3D first layer 22. The substrate 10 may be cooled using a powered internal cooling source 14 to decrease cooling time. As will be understood by one of ordinary skill, the first layer 22, as well as subsequent layers as described below, must be cooled slowly enough to allow sufficient crystal growth or formation. Cooling the material too quickly may not allow sufficient time for the nucleating crystals to grow throughout the thickness of the new drop or line of material using the crystal structure of the base layer 12 as a crystal seed layer. In another embodiment, the substrate 10 can be slightly heated to increase cooling time of the chocolate first layer 22 to maximize crystal formation. Additionally, ambient air around the cooling surfaces can be actively or passively dehumidified to reduce or prevent water contamination of the surface. In an embodiment, the ambient air around the cooling surfaces is dehumidified to a humidity of 50% or less.

Figure 3:
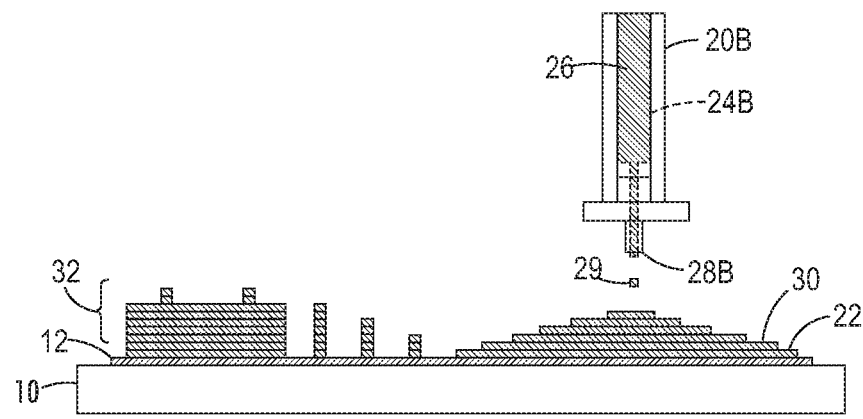

Subsequently, a 3D second layer 30 can be printed using the printer 20B as depicted in FIG. 3. FIG. 3 depicts a different printer 20B for illustration purposes. In contrast to printer 20A having a plurality of nozzles 28A, printer 20B includes a single nozzle 28B which prints all material. Printer 20B can be a single nozzle DOD printer, an extrusion printer, etc. Generally, the same printer may be used to print each of the printed layers.

Because the crystal structure of the 3D first layer 22 takes on the crystal structure of the base layer 12, the second layer 30 takes on the crystal structure of the 3D first layer 22 through physical contact, such that the first layer 22 function as a crystallization nucleus for the second layer 30.

Similarly, any number of additional layers 32 can be printed to build or manufacture a desired 3D shape as depicted in FIG. 3. A delay can be implemented after printing each layer so that a printed layer sufficiently cools and crystallizes before applying a subsequent layer. In an embodiment, the base layer 12 can have a first color, the first layer 22 can have a second color that can be the same or different from the first color, and any of the additional layers 32 can have a third color that is the same or different than the first color and/or the second color.

Figure 4:
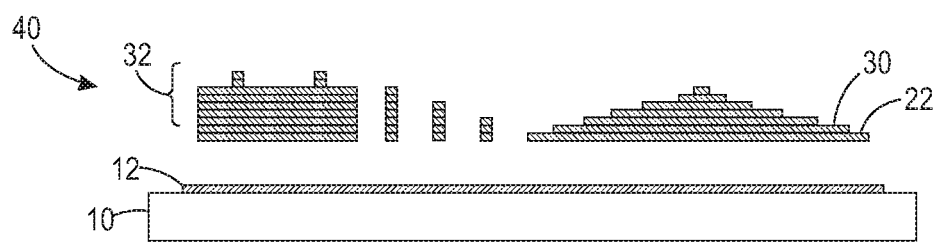

After the 3D structure 40 has been completed, it may be removed from the base layer 12 as depicted in FIG. 4. In an embodiment, the 3D structure may be removed from the base layer 12 using a blade, which may or may not be heated, to separate the 3D layer 40 from the base layer 12. In another embodiment, the optional heat source 14 within the substrate 10 can be heated sufficiently to soften the base layer 12, and the 3D structure 40 can be lifted from the base layer 12 using mechanical techniques or by a human operator. In yet another embodiment, a very thin base layer 12 or a base layer 12 in powder or granulated form is used such that regions of the base layer 12 which do not have an overlying layer of printed material 22, 30, 32 are left behind on the substrate 10 when the 3D structure is removed.

Figure 5:
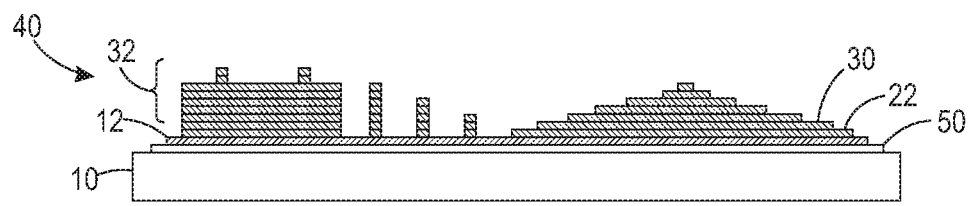
FIG. 5 is a cross section of a second embodiment of the present teachings for printing a three-dimensional structure having a desired crystal structure.

It is contemplated that, generally, the base layer 12 may remain as a part of the completed 3D structure. If the base layer 12 is to remain as part of the 3D structure, the base layer 12 can be formed on a release layer 50 to facilitate removal of the structure including layers 12, 22, 30, and 32 from the substrate 10. In an embodiment, for example when printing a chocolate layer as the ink, the release layer 50 can be a parchment paper or another release layer. As depicted in FIG. 5, the release layer 50 is interposed between the substrate 10 and the base layer 12 to facilitate removal of the 3D structure 40, including the base layer 12, from the substrate 10.

In another embodiment in which the base layer 12 is not part of the 3D structure, the release layer 50 as depicted in FIG. 5 can be placed onto the substrate 10 prior to formation of the base layer 12, or the base layer 12 can be formed on the parchment paper 50, and the assembly including the parchment paper 50 and the base layer 12 can be placed onto the substrate 10. Subsequently, the 3D structure 40 is formed according to the present teachings. Next, the parchment paper 50 with the overlying layers 12, 40 are removed from the substrate 10.

In another embodiment, after forming the 3D structure as depicted in FIG. 5, the parchment paper 50, base layer 12, and 3D structure 40 can be lifted off the substrate 10. Due to the low adhesion of the parchment paper 50, the paper 50 can be peeled off the base layer 12. Next, the base layer 12 can be abraded away using one of the techniques described above, or melted away, to leave the 3D structure 40.

Figure 6:
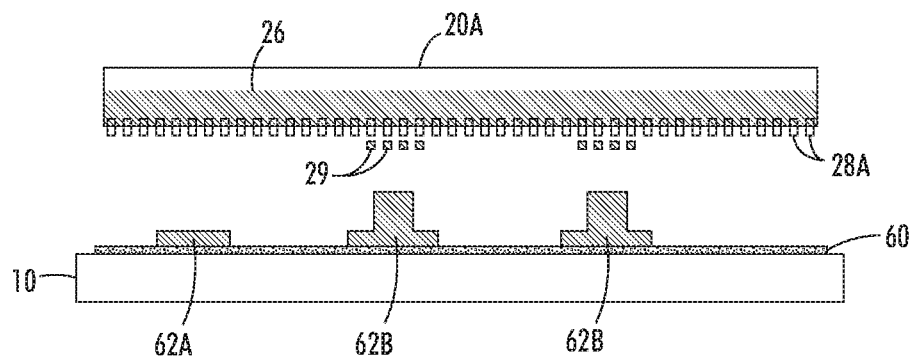
FIGS. 6, 7, and 8 are cross sections of a third embodiment of the present teachings for forming a three-dimensional structure having a desired crystal structure.
Figure 7:
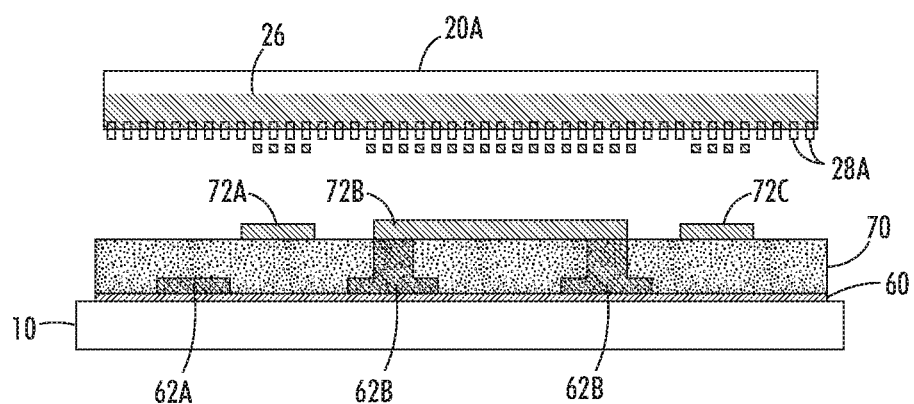
Figure 8:
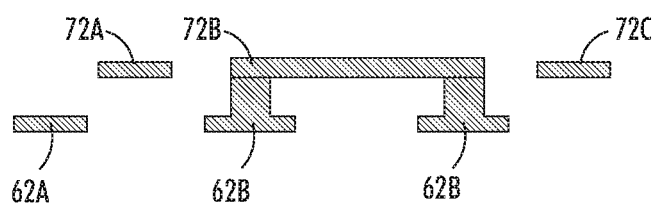

Another embodiment of the present teachings is depicted in the cross sections of FIGS. 6-8. As depicted in FIG. 6, a base layer 60 is formed on a substrate 10 to a sufficient thickness to function as a seed layer for one or more subsequent layers deposited using a printer 20A, such as a DOD printer. In this embodiment, the base layer 60 is a seed layer in crystal powder or granule form. After layering the substrate 10 with the powder base layer 60, the printer 20A prints a desired first layer 62 which includes portions 62A and 62B by ejecting a plurality of ink droplets 29 from the nozzles 28A in accordance with other embodiments of the present teachings. Because the printer 20A is a drop-on-demand printer, various different shapes as desired can be printed. In this embodiment, the base layer 60 has a desired crystal structure while the droplets 29 are heated for printing, and have a crystal structure which is different from the base layer 60. Through contact with the base layer 60, which functions as a crystal seed layer, the printed first layer 62 takes on the crystal form of the base layer 60.

Next, a second layer of crystal powder 70 is applied over the substrate 10 as depicted in FIG. 7. The second layer of crystal powder 70 can include the same material as base layer 60. Subsequently, a second printed layer 72 including portions 72A-C is printed over the crystal powder 70. Through contact with the crystal powder 70, portions 72A and 72C form with the crystal structure of the crystal powder 70 by using the crystal powder 70 as a crystallization nucleus. Portion 72B contacts both the crystal powder 70 and the first layer 62B, and thus forms with the crystal structure of the powder 70 and the first layer 62B. Additional powder layers can be deposited and additional layers can be printed as desired to form a 3D structure.

Next, the powder layers 60, 70 are removed. The powder layers 60, 70 can be removed by any sufficient process, for example by blowing the powder layers away using an air stream, by vacuuming the layers away, by rinsing, or removed using some other removal process. After the crystal powder layers 60, 70 are removed, the desired 3D structure as depicted in FIG. 8 remains.

Figure 9:
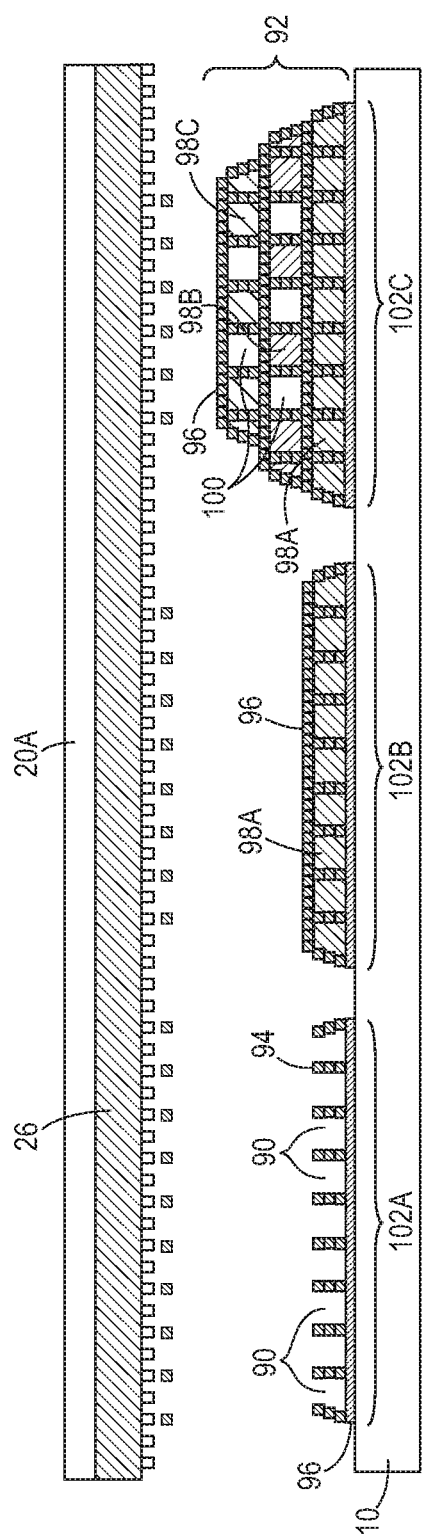
FIG. 9 is a cross section depicting formation of a confection according to an embodiment of the present teachings.

By printing chocolates with a drop-on-demand printhead, a much greater variety of structures is possible. One textural option includes the formation of cavities (i.e., chambers) 90 within the chocolate structure 92 as depicted in FIG. 9 to provide previously unrealized "mouthfeel" and taste. These cavities 90 may be controlled and formed by printing structures such as columns (i.e., walls, pillars) 94, a base (i.e., floor) 12, ceilings 96, ceilings, etc., where the floor(s) and ceiling(s) intersect the walls. The floors, walls, and ceilings may be formed on the order of sub-millimeter to several millimeters thick. In an embodiment, each cavity may have a cross sectional dimension (length and/or width) of between about 5 µm and about 10 mm, or between about 10 µm and about 1.0 mm, or between about 20 µm and about 100 µm. These cavities 90, which may have a cubic, rectangular cuboid, tetrahedral, octahedron, or other three-dimensional polyhedron shape, may be optionally filled with any desired chocolate or non-chocolate filling material 98A-98C, and different cavities 90 may be filled with the same or different materials in the same confection piece, and unfilled 100 cavities can be combined with filled cavities to provide a unique mouthfeel. A plurality of fillings 98A-98C can be distributed by location in the confection if the filling consistency lends itself to printing, or the filling 98 can be dispensed using a different dispensing method. If a printer or printhead 20A is used to dispense the filling 98, the drop-on-demand printhead that prints a chocolate mesh (i.e., web, matrix, or lattice) 94-98 may be used, or a different drop-on-demand printhead having a different form factor such as larger nozzle sizes may be used. In addition, structures that are neither filled nor totally closed can be utilized, for example to alter and customize the experience of eating. Variety in the experience typically increases a consumer's pleasure and can extend the time of the consumer's interest from the first bite through the entire process of eating.

FIG. 9 depicts a confection 102 during printing. At a first stage 102A, a DOD printer 20A prints walls 94 onto a floor 96 that has a desired temper. Using the floor 96 as a crystallization nucleus, the walls 94, printed at a temperature sufficient to melt the chocolate to a flowable and printable state as discussed above, which crystallizes during cooling through contact with the floor 96. In a second stage 102B, an optional filling 98A may be dispensed into the cavities 90, either by printing using DOD printhead 20A, a different DOD printhead, or using another technique. In a different embodiment, the cavities remain unfilled. After dispensing optional filling 98A, a ceiling 96 may be printed using the DOD printhead 20A. Subsequently, additional layers may be formed by continuing the process to form a completed confection 102C. A confection may be formed layer-by-layer to provide any number of desired layers.

Figure 10:
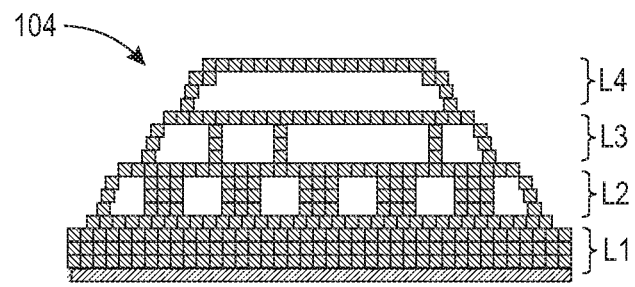
FIGS. 10 and 11 are cross sections depicting confections according to embodiments of the present teachings.

Various arrangements of walls and cavities are contemplated, some of which are depicted in the cross section of FIG. 10. For example, for a single confection 104, the wall may be solid across the entire level (i.e., no cavity), for example as depicted in Level 1 (L1) of FIG. 10, or a level may be entirely hollow (i.e., no walls other than the exterior) as depicted in level 4 (L4). Further, any walls (and thus the cavities) may be distributed symmetrically across the level as depicted in level 2 (L2), or the walls may be asymmetrically distributed across the level as depicted in level 3 (L3). As further depicted, the walls may have different thicknesses as well as different configurations. For example, the walls in L2 are three times the thickness of the walls in L3. If the walls are formed across an entire width of the confection as depicted in L1, then more bite resistance will be provided in that direction. If the walls are only partially formed across the width of the confection as depicted in L2 and L3, or the level is hollow as depicted in L4, then the structure will more readily collapse and the confection will provide less bite resistance. By using the selective formation of walls and floors/ceilings, the collapse of the structure on initial bites may be engineered to provide a varying consumer experience. Various parts of the confection can be engineered with directional structures, such as oblique walls of equal or varying thicknesses, walls that extend at an angle from a floor or ceiling, and various angles (not individually depicted for simplicity) that vary the experience within even a single bite.

As discussed above, consumers take cues on how much to eat largely based on visual appearance of the product before it is consumed rather than on the actual caloric value of the product itself. Lowering a product's calorie count by removing fat and/or sugar may result in a flat and unsatisfying consumer experience. Hollow chocolate does not produce a desirable consumer experience, as a bite simply breaks the outer shell and provides no subsequent bite resistance. Aerated chocolate formed by injecting gas at high pressures into the molten chocolate has a conventional external form factor and reduces overall calorie count. However, the randomized air bubbles provide a less-than-desirable texture as the product is consumed. Further, the randomized bubbles in the internal structure of the uneaten portion of the product after an initial bite are not visually appealing.

In an embodiment of the present teachings, a high quality confection may be engineered and manufactured with a drop-on-demand printhead to have a lower calorie count than other confections while maintaining an ordered and/or non-random internal structure, as well as an external form factor and mouthfeel that are similar to conventional, non-aerated chocolate. The internal structure is non-random, at least because the confection floors, walls, and ceilings are designed prior to printing and programmed into the printer, which prints the designed confection internal structure during printing. A mesh of crystalline chocolate with relatively thicker vertical walls parallel to the bite direction and relatively thinner horizontal supports perpendicular to the bite direction, for example similar to level L2 in the confection 104 of FIG. 10 (with the bite direction being vertical with respect to FIG. 10), may be printed to provide a confection that provides a suitable mouthfeel while reducing the number of calories. Variations of the size and interconnected chocolate can be engineered to provide different and desirable mouthfeels. Thin structures, such as the walls in L3, will collapse more easily, while thick structures, such as L1 and the walls of L2, can be designed to provide significantly more bite resistance that mimics a conventional chocolate while providing fewer calories through the incorporation of ordered space within the chocolate. Thus different chocolates can be designed to behave and feel differently in the mouth.

Similarly, the length of individual segments of chocolate within the internal structure will affect mouthfeel. Hollow space above or below a segment, such as L4 in FIG. 10, will collapse from a bite before the segment can provide significant resistance. Long segments such as L1 can provide resistance sooner in a bite, while shorter ones such as L2 provide resistance only after all the hollow spaces have collapsed or been filled with chocolate from a different level as the bit reduces the size.

Another potential benefit of ordered, non-random structures within the chocolate may be to provide increased surface area. This provides more opportunities for the release of volatile compounds such as aroma extracts of cocoa beans, for example, 2- and 3-methylbutanoic acid, acetic acid, 3-methylbutanal, 4-hydroxy-2,5-dimethyl-3(2H)-furanone, 2- and 3-methylbutanoic acid, 3-methylbutanal and phenylacetaldehyde, 4-hydroxy-2,5-dimethyl-3(2H)-furanone, 3-methylbutanoic acid, ethyl 2-methylbutanoate, and 2-phenylethanol, and combinations of two or more of these. Additionally, ordered, non-random structures within the chocolate may allow saliva to better mix with the confection. Either of these uses may potentially enhance the intensity of the flavor. Further, a plurality of very fine chocolate whiskers on the order of 100 microns thick dispensed into the internal confection mesh during manufacture of the chocolate may be included to extend into the gaseous volatile compounds. The plurality of whiskers provide a very high surface area with a small amount of material, potentially greatly enhancing the release of volatile compounds once the outer surface of the chocolate is broken. Chocolate whiskers may be printed to have a diameter of between about 10 μm and 30 μm, for example about 20 μm, and a height of between about 5 mm and about 20 mm, for example about 12 mm.

Variable forms mentioned in previous examples, including walls of different target thickness and target lengths, can be provided within a single chocolate. This may allow a single confection to provide different mouthfeels depending on the orientation of the confection during a bite by the consumer. If long wall segments are only provided in one direction but across the whole confection, then biting parallel to that direction provides significant resistance, while biting perpendicular provides much less resistance. So a consumer can be encouraged to experience the confections in different ways depending on how the confection is oriented relative to the teeth. Another variation may include manufacturing walls of different thicknesses or lengths in different parts of the confection. Thin walls toward the outer portion of the confection will collapse easily on an initial portion of a bite, while thicker walls toward the middle of the confection will provide significant resistance as the bite is completed. Thus the mouthfeel provides low resistance at first but will increase significantly later in the bite.

Chocolate comes in many different states depending on how it is processed and its origin (variety of tree, growing location, fermentation, drying, roasting, alkalization, additional ingredients and conching. In an embodiment, these different varieties can be incorporated as separate homogeneous structures (as opposed to simply mixing different varieties in a heterogeneous mixture) within a single confection such as a candy bar to release unique volatile profiles from different parts of the candy bar. For example, these homogeneous volatile profiles can be stored in different cavities within the chocolate bar (for example, as depicted in FIG. 9) by making the walls surrounding those cavities out of a particular variety of chocolate. In an embodiment, an inexpensive chocolate type, for example a chocolate that has been conched for a minimal amount of time, may form some walls of the confection, for example L2 in FIG. 10, while an expensive chocolate, for example a chocolate that has been conched for up to 72 hours, may be used for other layers such as L3, such that the expensive chocolate aromatics dominate. In an embodiment, an inexpensive chocolate substructure that forms the interior mesh may be coated with an expensive chocolate shell.

As discussed above, any open mesh structures described above can be filled, for example by injecting a fluid or viscous material 98 into the walled receptacles or cavities. A filling will change the mouthfeel of the chocolate. Partially filled cavities will behave differently from fully filled ones, and cavities filled with a viscous but still liquid fruit flavor will be experienced differently from ones filled with solid but soft materials such as a ganache. Other confections may include different fillings that are individually (separately) encapsulated within a mesh and enclosed within the interior of the confection. The fillings may be added during confection manufacture by printing a floor and vertical walls to form a plurality of cavities, dispensing a different filling, or the same filling, within each cavity, printing a ceiling over the one or more fillings to fully encapsulate the filling, and then optionally forming additional cavities and fillings over the initial structures to construct a confection layer-by-layer. The regions where the chocolate is printed may be contiguous to previously hardened/crystalized chocolate to result in the proper crystalline form using the previous chocolate material as a crystallization nucleus.

In an embodiment, horizontal ceilings over hollow cavities may be formed by slightly overlapping a chocolate drop such that it physically contacts a previously formed and cooled drop. This may result in a confection such as 140 depicted in FIG. 11 having an angled ceiling 142 connected to vertical walls 144, wherein a surface of the angled ceiling 142, for example a curved or generally planar surface, intersects a surface of the vertical wall 144, for example a curved or generally planar surface, at an angle of greater or less than 90°. In another embodiment, such as confection 112 in FIG. 11, the formation of a horizontal ceiling 124 having a planar surface that contact a planar surface of a vertical wall 122 using this technique is also contemplated. In another embodiment, a plurality of vertical walls 94 may be formed as depicted in 102A of FIG. 9, and then the structure 102A may be rotated, for example by 90° or another angle, such that the ceilings 96 are formed in a more vertical direction and the walls intersect the ceiling at 90°, or between about 85° and about 95°. After formation of at least part or all of the ceiling 96, the structure may be rotated back into the orientation of 102A to form the walls 94 of the next level on the ceiling 96.

Final closing of the internal mesh structure may be performed in several ways. For example, if the fillings are dispensed by printing them into the cavities of the mesh using a DOD printhead, the openings may be closed by printing chocolate around the opening using a DOD printhead as depicted in FIG. 9, allowing each chocolate drop to be physically connected to previously printed chocolate so that proper crystallization occurs. In an alternate embodiment, if extra chocolate is printed around an opening, for example to inject a filling, then the chocolate may be re-melted to a temperature below the tempering point to allow the chocolate to spread and close the opening. In another embodiment, a properly tempered chocolate piece may be placed to cover the opening before a printed melted region around the opening has solidified. In another embodiment, the entire structure may be coated by properly tempered chocolate by conventional methods such as dipping or pouring.

It is contemplated that substances including volatile gas compounds such as fruity, savory, spicy, coffee, etc., esters, for example methyl butanoate, ethyl butanoate, methyl hexanoate, and ethyl hexanoate for coffee flavors, β-damascenone for an aroma like cooked apples, 2-furfurylthiol for a sulfury or roasty flavor, 2-isobutyl-3-methoxypyrazine for an earthy flavor, guaiacol for a spicy flavor, 2,3-butanedione for a buttery flavor, and 4-hydroxy-2,5-dimethyl-3(2H)-furanone for a caramel flavor, among others, may be incorporated into the chocolate cavities of a mesh to maximize a contribution of odor to the taste sensation that is experienced while contributing little to the caloric content of the confection. These volatile compounds may be incorporated into the confection by manufacturing the confection in a closed (i.e., sealed) cavity filled with the volatile gas. The inclusion of volatile compounds can be increased by chilling the cavity during manufacture to form a concentrated gas incorporated into the internal mesh of the confection. After dispensing the filling into the cavity, either by DOD printing or some other dispensing technique, the cavity may be sealed by printing a ceiling to prevent outgassing of the volatile compound. In another embodiment, the volatile compounds may be trapped within other edible liquid or viscous carrier materials and dispensed into one or more cavities within the confection as a filling.

When including layers of filling, the top of the filling itself is not a nucleation site. These regions may be bridged by properly tempered chocolate by printing out from a wall of previously printed, properly tempered chocolate that will nucleate the subsequently printed ceiling that seals the filling within the chocolate mesh. Untempered chocolate on the outside of a confection is undesirable, as chocolate that is not properly tempered lacks snap, shine, and tends to melt at lower temperatures, for example when handled. However, these qualities are not necessarily detriments for structure within the interior of a confection. Printing non-tempered chocolate structures over fillings without connecting to nucleated regions while printing a properly tempered chocolate on the outside may result in a desirable confection that has a soft, quickly melting interior.

In an embodiment, different fillings may be provided on different layers of a confection. For example, fillings may be varied from the inside to the outside of a confection, or from one side to another. This would allow, for example, a bar of chocolate to have encapsulated flavorings that vary from a first end of the confection (such as a candy bar) to a second end opposite the first end, or a confection that has segments, for example segments that may be physically separated by the consumer prior to eating, that vary by flavor.

In another embodiment, the 3D printing embodiments of various embodiments may be used to form external structures with different textures. In other words, some of the pillars/walls/cavities may be on the external surface of the confection. These would allow a consumer to place the confection in their mouth and experience the textural variety without chewing. Besides being decorative, these structures, if sufficiently tall, might significantly change the eating experience. For example, for only a moment after putting the confection into the mouth, only the tops of the structures would melt, yet saliva would interact with a greater surface area to produce a more intense flavor. Overall, the melting of the pillars, texturally, would be noticeably different to the tongue, which would initially contact the pillars in fewer places. Because of the open structure, the pillars may be brought up to mouth temperature more quickly and thus melts more quickly than will a solid block of chocolate of the same volume.

Figure 11:
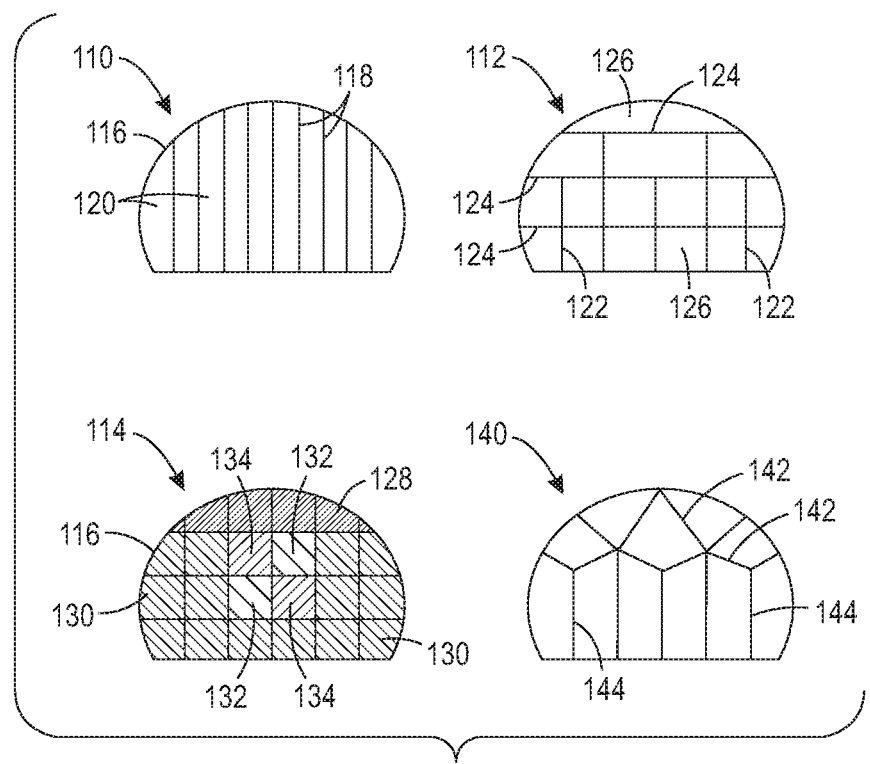

Various confection configurations printed using a DOD printer or an extrusion printer according to a method discussed above are depicted in the cross sections of structures 110, 112, 114, and 140 in FIG. 11. For example, confection 110 includes an outer shell 116, a plurality of vertical walls (parallel with respect to the bite direction) 118, and a plurality of hollow cavities 120, although it is contemplated that each cavity 120 may include the same or different fillings. In this embodiment, the confection does not include horizontal ceilings internal to the confection. The vertical walls may be formed from different chocolate types, or the same chocolate type, and the outer shell 116 may be formed from the same chocolate type, or a different chocolate type, from the walls 118. The vertical walls of confection 110 extend from the floor to the outer shell 116, and each cavity 120 exposes both the floor and the outer shell 116 within the confection (i.e., the space within the cavity contacts the floor and the outer shell, or connects the floor to the outer shell with the space within the cavity). Confection 112 includes an outer shell 116, a plurality of vertical walls 122, a plurality of horizontal walls 124, and a plurality of hollow cavities 126 that form a mesh, although the cavities may be filled with the same or different fillings. The cavities 126 are irregular in shape between adjacent levels, and the outer shell seals the plurality of cavities within the confection. Confection 114 includes a particular arrangement of fillings, including a first filling 128, a second filling 130 that is different from the first filling 128, and a third filling 132 different from the other two fillings 128, 130, and a fourth filling 134 different from the other three fillings 128, 130, 132. The first filling 128 is only located at the top, while the second filling 130, located at the lower exterior portion of the confection 114, surrounds the third 132 and fourth 134 fillings that are located in the center of the confection 114. Confection 140 depicts angled ceilings 142 connected to vertical walls 144 and a plurality of hollow cavities, which may also be filled.

Thus the present teachings can result in a printed 3D structure, for example a chocolate structure that has a desired crystalline structure. In the case of chocolate, the 3D structure can have a desirable temper, for example a type V cocoa butter crystal structure. An in-temper base layer can be used as a crystallization nucleus or crystal seed for a printed chocolate layer. The base layer can be formed mechanically without the use of 3D printing. The base layer should be sufficiently thick so as to prevent complete melting to the point of losing its crystalline structure when a drop of chocolate or a chocolate strip at elevated temperatures is printed on top. This base layer then functions as a crystal seed to nucleate crystallization of the chocolate printed on top in the desired form. Subsequent drops or strips of chocolate will then be nucleated by the previous drops in the proper crystal form.

The chocolate in-temper base layer serves a number of purposes. First, by acting as a nucleation site, it accelerates the rate of solidification of the chocolate printed thereon. Second, the chocolates produced using the printer can be in temper. Third, because the printed chocolates are in temper, they have the desirable characteristics associated with in-temper chocolates, such as being more stable with a higher melting point than untempered chocolates, a desirable snap, and a shiny surface.

For use with materials other than chocolate, it is contemplated that a liquid material printed with a non-desirable crystal structure can be processed, for example by heating, to remove (evaporate) one or more solvents or other thinning component and to solidify the liquid material to form a solid layer. As the solvent is removed the liquid printed material is seeded to a desired crystal structure by the base layer as the liquid printed material solidifies. For application to food, a typical solvent would be water and typical seed materials would be one or more crystals of sugar or one or more crystals of salt.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for printing a three-dimensional edible confection, comprising:
   printing two or more layers of a second material onto a base layer of a first material using a printer, wherein the first material is edible and has a crystalline structure, and wherein the second material is liquid and has no crystalline structure;
   processing the two or more layers of the second material to solidify the two or more layers of the second material, thereby forming the three-dimensional edible confection, which has a plurality of walls defining two or more cavities therein, wherein a lowermost one of the two or more layers of the second material takes on the crystalline structure of the base layer using the base layer as a crystal seed layer; and
   varying a temperature of a substrate on which the base layer is positioned using a powered internal heating source or a powered internal cooling source.

2. The method of claim 1, wherein the two or more cavities comprise a first cavity that is enclosed by the two or more layers of the second material.

3. The method of claim 2, wherein, before being enclosed, the first cavity is filled with a third material while printing the two or more layers of the second material, wherein the third material is edible and is different from the first material and the second material.

4. The method of claim 3, wherein the two or more cavities comprise a second cavity that is enclosed by the two or more layers of the second material, wherein, before being enclosed, the second cavity is filled with a fourth material while printing the two or more layers of the second material, wherein the fourth material is edible and is different from the first material, the second material, and the third material.

5. The method of claim 2, wherein, before being enclosed, the first cavity is filled with a volatile compound.

6. The method of claim 1, wherein the plurality of walls are oriented to provide different mouthfeels depending on a direction that a person bites the confection.

7. The method of claim 1, wherein the plurality of walls comprises a first wall and a second wall, wherein the first wall has a different thickness than the second wall such that the first wall and the second wall provide different mouthfeels when a person bites the confection.

8. The method of claim 1, wherein the two or more cavities comprise a first cavity that is not enclosed by the two or more layers of the second material.

9. The method of claim 8, wherein the plurality of walls comprises one or more first walls that define the first cavity and one or more second walls that define a solid surface, wherein the one or more first walls melt more rapidly in a person's mouth than the one or more second walls.

10. The method of claim 1, wherein the first material is a first chocolate and the crystalline structure is a type V crystalline structure, and wherein the second material is a second chocolate that takes on the type V crystalline structure while processing the two or more layers of the second material.

11. The method of claim 10, wherein the printer comprises an enclosure that is dehumidified.

12. The method of claim 10, further comprising processing chocolate in the printer with heating and cooling cycles to produce the base layer of the first material before printing the two or more layers of the second material.

13. The method of claim 1, wherein the base layer of the first material comprises salt, and the two or more layers of the second material comprise salt.

14. The method of claim 13, wherein the two or more layers of the second material are dissolved in a solvent comprising water prior to printing.

15. The method of claim 14, wherein the printer comprises an enclosure that is heated and dehumidified.

16. The method of claim 1, wherein the base layer of the first material comprises sugar, and the two or more layers of the second material comprise sugar.

17. The method of claim 16, wherein the two or more layers of the second material are dissolved in a solvent comprising water prior to printing.

18. The method of claim 17, wherein the printer comprises an enclosure that is heated and dehumidified.

19. A method for printing a three-dimensional edible confection, comprising:
   printing two or more layers of a second material onto a base layer of a first material using a printer, wherein the first material is edible and has a crystalline structure, and wherein the second material is an untempered liquid chocolate and has no crystalline structure;
   processing the two or more layers of the second material to solidify the two or more layers of the second material, thereby forming the three-dimensional edible confection, which has a plurality of walls defining two or more cavities therein, wherein a first of the two or more layers of the second material takes on the crystalline structure of the base layer using the base layer as a crystal seed layer, wherein a second of the two or more layers of the second material subsequently takes on the crystalline structure of the first of the two or more layers of the second material using the first of the two or more layers of the second material as the crystal seed layer, and wherein the first of the two or more layers of the second material is positioned between the base layer and the second of the two or more layers of the second material; and
   varying a temperature of a substrate on which the base layer is positioned to vary a cooling time of the three-dimensional edible confection to improve crystallization.

20. A method for printing a three-dimensional edible confection, comprising:
   printing two or more layers of a second material onto a base layer of a first material using a printer, wherein the first material is edible and has a crystalline structure, and wherein the second material is an untempered liquid chocolate and has no crystalline structure;
   processing the two or more layers of the second material to solidify the two or more layers of the second material, thereby forming the three-dimensional edible confection, which has a plurality of walls defining two or more cavities therein; and
   varying a temperature of a substrate on which the base layer is positioned using a powered internal heating source or a powered internal cooling source, wherein:
      the walls are oriented to provide different mouthfeels depending on a direction that a person bites the three-dimensional edible confection,
      the two or more cavities comprise a first cavity that is enclosed by the two or more layers of the second material,
      before being enclosed, the first cavity is filled with a third material while printing the two or more layers of the second material,
      the third material is edible and is different from the first material and the second material,
      a first of the two or more layers of the second material takes on the crystalline structure of the base layer using the base layer as a crystal seed layer,
      a second of the two or more layers of the second material subsequently takes on the crystalline structure of the first of the two or more layers of the second material using the first of the two or more layers of the second material as the crystal seed layer, and
      the first of the two or more layers of the second material is positioned between the base layer and the second of the two or more layers of the second material.

21. The method of claim 1, wherein the temperature of the substrate is varied to vary a cooling time of the three-dimensional edible confection to improve crystallization.

22. The method of claim 1, wherein the temperature of the substrate is varied to vary an amount of a solvent that evaporates from the three-dimensional edible confection to improve crystallization.

23. The method of claim 1, further comprising filling the two or more cavities with a material using a 3D printer.

24. The method of claim 1, further comprising forming an angled ceiling over the two or more cavities by overlapping a drop of the second material such that the drop physically contacts a previously-formed cooled drop of the second material.

25. The method of claim 1, further comprising forming a ceiling over the two or more cavities by rotating the three-dimensional edible confection such that the ceiling is formed in a substantially vertical direction.

* * * * *